2,980,496
PROCESS FOR PURIFYING FLUORIDE-CONTAMINATED COLUMBIUM AND TANTALUM COMPOUNDS

John D. Mettler, Jr., Niagara Falls, N.Y., assignor to Union Carbide Corporation, a corporation of New York No Drawing. Filed Dec. 24, 1957, Ser. No. 704,906

4 Claims. (Cl. 23—16)

This invention relates to the purification of fluorine-contaminated columbium and/or tantalum oxides.

In the purification and separation of tantalum and columbium from solid starting materials such as their ores, it is common practice to first solubilize the metal values in an aqueous acid solution containing fluorides. The tantalum and columbium values are extracted from the acid solution with an organic solvent; the extracted metal values are then selectively stripped from the organic phase with an aqueous solution. The aqueous-strip liquor is treated so as to precipitate tantalum and columbium oxides. A typical analysis of a wet filter cake from a tantalum precipitate is 7 percent fluorine, 3 percent ammonia, 40 percent water and 50 percent tantalum pentoxide. A typical analysis of a columbium wet cake is 4 percent fluorine, 2 percent ammonia, 62 percent water and 34 percent columbium pentoxide.

As may be seen from these analyses, the cakes contain a high percentage of fluoride material. Before either of the metal oxide materials can be processed to the elemental metal, the water of hydration and the fluorides must be removed. The presence of fluorine lowers the metal recovery and fouls and corrodes the reduction equipment. Further, for direct sale of the cake material, a low fluorine content is required, since the usual commercial fluoride specification for saleable oxides is a maximum of 0.1 percent.

The removal of the fluoride presents a complicated and involved problem. Heating the contaminated precipitate at 400° C. or higher in air satisfactorily removes the water of hydration; the fluoride content of the precipitate, however, is not satisfactorily reduced.

The effect of the purifying treatment on the materials of construction of the purifying equipment, purity of product, temperature of operation and efficiency of recovery must be considered in selecting a satisfactory operating procedure.

One method which has been employed to lower the fluoride content of the tantalum and columbium precipitates is calcination of the wet cake in a gas-fired muffle furnace. When tantalum filter cake was subjected to an 8 hour calcining cycle at temperatures in excess of 800° C. in air and steam atmospheres, a satisfactory degree of fluorine removal was attained whether the product treated was dry cake treated wtih steam, or a wet cake treated in air. However, the equipment was badly attacked in every case. The trays containing the filter cake were fabricated of a commercial chromium-containing nickel base alloy. These trays were severly attacked during the calcination, and the calcined product was contaminated with flakes of the corrosion product. In addition, the silicon-carbon muffle of the furnace was corroded by the calcination fumes.

To avoid high-temperature calcination with its corresponding corrosion problems, a lower temperature method was attempted. Filter cake was treated with a material which would convert the fluoride to ammonium fluoride or hydrogen fluoride, thereby permitting low temperature volatilization of the fluorides. Ammonium carbonate, ammonium chloride, ammonium sulfite and sulfuric acid are illustrative of the additive compounds which were employed for this purpose. Samples of wet and dry cakes which had been treated with 200 percent of the stoichiometric weight of the treating agent required to remove the fluoride as ammonium fluoride or hydrogen fluoride were heated in air at 400° C. for 18 hours. Graphite crucibles were used in the tests and showed no weight loss with heating. Further, there was no apparent fluoride attack on the furnace muffle. However, at the temperature employed, the ammonium chloride and ammonium sulfite did not satisfactorily decompose, thereby contaminating the product with these additives in all of the cases so treated. The lowest final fluoride content achieved was 3.81 percent, considerably in excess of the amount which can be tolerated. Thus, it may be seen that low temperature calcination is not satisfactory for the purpose of commercial fluoride purification.

Accordingly, it is an object of this invention to provide a process for fluoride removal from columbium and tantalum wet cakes by calcination techniques.

It is another object of the invention to provide a process for fluoride removal from columbium and tantalum wet cakes, wherein common materials of construction may be employed in the purification apparatus.

Other objects will be apparent from the subsequent disclosure and appended claims.

The process which satisfies the objects of the present invention comprises the steps of air-drying the fluoride-contaminated columbium and tantalum oxide precipitate to remove the bulk of the water and subsequently calcining the dry material in a carbon monoxide atmosphere.

The calcination of the dried material is conducted in an open graphite vessel contained in a suitable furnace, such as muffle type furnace lined with a chromium-containing nickel base alloy. The presence of a carbon monoxide atmosphere serves to protect the graphite trays from oxidation. By continually sweeping the furnace with the reducing gas, the muffle furnace liner is not attacked by evolved fluorides since the fluorides are diluted and free of moisture. Contrary to what might be expected, an oxidizing agent is unnecessary to prevent a loss of tantalum (as volatile tantalum fluoride). This is shown by the examples of the present invention.

The fluoride content of the columbium and/or tantalum filter cake prior to calcination is preferably less than about 4 percent. A filter cake containing more than 4 percent fluorine may be treated prior to drying and calcination to reduce the fluoride content by treating the filter cake with an additive, as described previously, and volatilizing the fluoride as ammonium fluoride or hydrogen fluoride. However, merely washing the filter cake material with water in situ in the filter will satisfactorily lower the fluoride content below 4 percent. For example, in the case of columbium filter cake containing from 14 to 20 percent fluorine, the fluoride has been lowered to from slightly less than 1 percent up to about 4 percent by water washing.

EXAMPLE I

About 180 pounds of wet cake containing 83.60 percent of tantalum pentoxide, 0.01 percent of iron, 0.13 percent of carbon, 0.016 percent columbium, and contaminated with 0.57 percent of fluoride, was fed into a furnace of the type described. Ten pounds of wet cake were loaded into each graphite tray, with each tray having a ten-hour pass through the furnace. The temperature of calcination was varied from 800° C. to 1000° C. as the trays passed through the furnace. Fluoride analysis of the treated materials are shown in Table I.

Table I

| Product Calcination Treatment | | Percent F |
|---|---|---|
| Hours at 800° C. | Hours at 1000° C. | |
| 10 | 0 | 0.21 |
| 8 | 2 | 0.13 |
| 4 | 6 | 0.01 |
| 2 | 8 | 0.03 |
| 0 | 10 | 0.06 |

EXAMPLE II

In another example of the invention, 180 pounds of tantalum pentoxide cake similar to the cake of Example I, and containing 1 percent fluoride, was calcined at 1000° C. for varying periods of time. The product in each case contained better than 99 percent tantalum pentoxide, less than 0.02 percent of titanium dioxide and the fluoride content shown in Table II.

Table II

| Hours at 1000° C.: | Percent F |
|---|---|
| 7½ | 0.06 |
| 6¼ | 0.08 |
| 5 | 0.06 |

EXAMPLE III

In an example on a larger scale of purification of tantalum pentoxide, 282 pounds of a cake containing 72.8 percent of tantalum pentoxide, 0.013 percent columbium, 0.009 of iron, 0.14 of carbon, 0.0018 percent nickel, 1.0 percent fluorine and 0.092 percent silicon were fed into a furnace maintained at 1000° C. with 8 pounds of cake per tray. Approximately 195 pounds of product were obtained having an analysis of 99.6 percent tantalum pentoxide, 0.021 percent of iron, 0.03 percent carbon, 0.0024 percent nickel, 0.013 percent of fluorine and 0.055 percent of silicon which represented a tantalum recovery of 95 percent.

EXAMPLE IV

The procedure of Example III was repeated with 207 pounds of a cake containing 84.05 percent tantalum pentoxide, 0.016 percent of columbium pentoxide and 3.2 percent of fluorine, to produce 174 pounds of a product containing 0.02 percent of columbium pentoxide, 0.06 percent of fluorine, less than 0.01 percent of each of iron titanium and silica. The tantalum recovery was 100 percent.

EXAMPLE V

In an example of purification of columbium oxide by the process of the present invention, 222 pounds of a cake containing 62.16 percent columbium pentoxide, 0.14 percent of tantalum pentoxide, 0.04 percent of iron, 0.09 percent of titanium, 0.01 percent of silica and 6.0 percent of fluorine was fed into a furnace maintained at 1100° C. to produce 131 pounds of product containing 0.17 percent tantalum pentoxide, 0.027 percent iron, 0.045 percent of titanium, less than 0.01 percent of silica, less than 0.01 percent of fluorine, 0.008 percent of carbon with a columbium pentoxide recovery of 94.2 percent.

EXAMPLE VI

A fluoride-contaminated columbium hydroxide was calcined at a temperature of 1000° C. according to the procedure described in Example V, and the resulting product was heated for 4 hours at 850° C. in air to refine the product by oxidation. The refined product was a white, columbium pentoxide cake containing less than 0.01 percent fluorine.

EXAMPLE VII

Another sample of the fluoride-contaminated columbium hydroxide of Example VI was calcined for 6 hours at a temperature of 1100° C. followed by air oxidation at a temperature of 750° C. for 6 hours to remove cake discoloration. Samples of the product showed the following average analysis:

| | Percent |
|---|---|
| Fluorine | 0.008 |
| Ferric oxide | 0.021 |
| Tantalum pentoxide | 0.06 |
| Columbium pentoxide | 99.91 |

The following analysis is representative of the reducing gas atmosphere which was maintained in the furnace for the above examples: Carbon monoxide 76.6 percent, hydrogen 12.4 percent, nitrogen 5.3 percent, carbon dioxide 3.0 percent, oxygen 1.2 percent, methane 1.5 percent.

The product of the experiments tends to be discolored when removed from the furnace. Tantalum pentoxide is gray and columbium pentoxide is black. However, a heating in air at about 850° C. for about 8 hours subsequent to the calcination will remove the discoloration from the cake. Chromium-containing nickel alloys may be used as the construction material for the vessels for this air heating; corrosion problem is non-existent due to the fact that substantially all of the fluoride has been removed. Examination of the equipment used in the previously described calcination examples showed no evidence of fluoride attack on the graphite trays, with negligible weight loses from the heating cycle. The metal liner of the furnace showed a slight film coating on the exhaust end. However, the liner itself showed no corrosion attack, nor was the furnace muffle attacked.

As may be seen from the above examples, ten hours of calcination at 800° C. does not remove the fluoride to the extent generally desired by commercial standards although considerable purification is obtained. Heating of the fluoride contaminated product in graphite trays for 4 hours at 800° C. followed by 6 hours at 1000° C. satisfactorily reduces the fluoride contamination; 5 hours of heating at 1000° C. is also satisfactory. With columbium filter cake material, high calcination temperatures of about 1100° C. have been found to be most satisfactory, although lower temperatures for extended periods of time may be utilized.

What is claimed is:

1. A process for purifying fluoride-contaminated tantalum pentoxide which comprises reducing the fluoride content of said fluoride-contaminated tantalum pentoxide to below about 4 weight percent by washing said pentoxide with water; substantially drying the washed pentoxide without substantial evolution of gaseous fluorine compounds; and calcining the dried pentoxide at a temperature of at least about 1000° C. in a carbon monoxide atmosphere in a graphite vessel until the fluoride contamination of the pentoxide is reduced below about 0.1 weight percent.

2. A process for purifying fluoride-contaminated columbium pentoxide which comprises reducing the fluoride content of said fluoride-contaminated columbium pentoxide to below about 4 weight percent by washing said pentoxide with water; substantially drying the washed pentoxide without substantial evolution of gaseous fluorine compounds; and calcining the dried pentoxide at a temperature of at least about 1100° C. in a carbon monoxide atmosphere in a graphite vessel until the fluoride contamination of the pentoxide is reduced below about 0.1 weight percent.

3. A process for purifying fluoride-contaminated columbium hydroxide which comprises reducing the fluoride content of said fluoride-contaminated columbium hydroxide to below about 4 weight percent by washing said hydroxide; substantially drying the washed hydroxide without substantial evolution of gaseous fluorine compounds; and calcining the dried hydroxide at a temperature of at least about 800° C. in a carbon monoxide atmosphere in a graphite vessel until the fluoride contamination of the hydroxide is reduced below about 0.1 weight percent.

4. A process for purifying at least one fluoride-contaminated compound selected from the group consisting of oxides and hydroxides of columbium and tantalum comprising reducing the fluoride content of said fluoride-contaminated oxides and hydroxides of columbium and tantalum to less than about 6 weight percent; substantially drying said fluoride-contaminated compound without substantial evolution of gaseous fluorine compounds; and subsequently calcining the dried fluoride-contaminated compound in a carbon monoxide atmosphere in a graphite vessel at a temperature of at least about 800° C. until the fluoride contamination of said fluoride-contaminated compound is reduced to below about 0.1 weight percent.

References Cited in the file of this patent

UNITED STATES PATENTS

| 799,441 | Bolton | Sept. 12, 1905 |
| 958,180 | Schilling | May 17, 1910 |
| 2,107,277 | Austin | Feb. 8, 1938 |
| 2,270,502 | Bucher | Jan. 20, 1942 |
| 2,659,655 | Sweet | Nov. 17, 1953 |
| 2,829,947 | Schaefer et al. | Apr. 8, 1958 |

OTHER REFERENCES

Mellor: "Comprehensive Treatise on Inorganic and Theoretical Chemistry," Longmans, Green and Co., N.Y., 1927, vol. 9, pages 841, 842, 858.